S. & M. PENNOCK.
Grain-Drill.
No. 7,495.
Patented July 9, 1850.
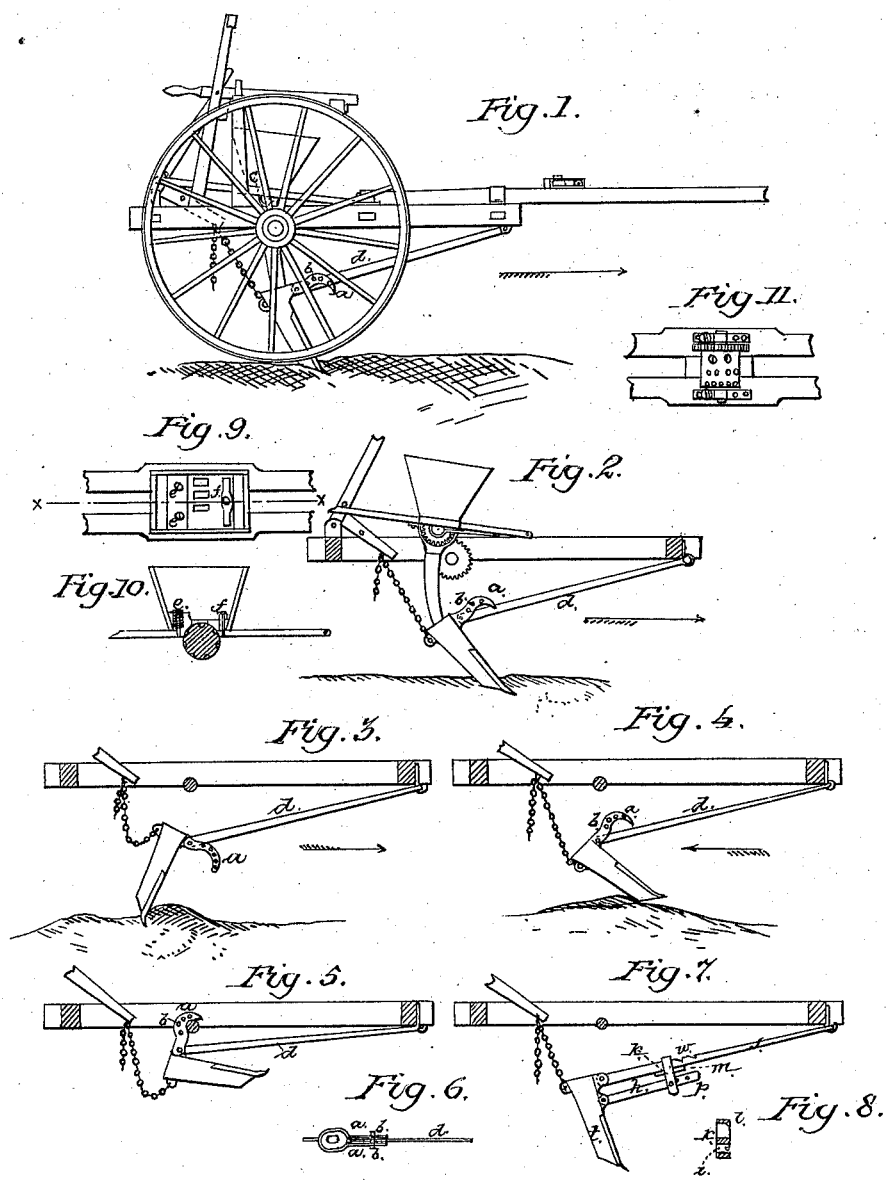

UNITED STATES PATENT OFFICE.

SAML. PENNOCK AND MORTON PENNOCK, OF KENNETT SQUARE, PA.

IMPROVEMENT IN SEEDING APPARATUS FOR SEED-PLANTERS.

Specification forming part of Letters Patent No. 7,495, dated July 9, 1850.

*To all whom it may concern:*

Be it known that we, SAMUEL PENNOCK and MORTON PENNOCK, of Kennett Square, Chester county, and State of Pennsylvania, have invented certain new and useful improvements on our patented machine for planting seed and grain, which are described as follows, reference being had to the annexed drawings of the same, making part of this specification.

This machine in its general construction and arrangement of parts is like our seeding-machine on which a patent was reissued in the year 1849, as will be seen by an inspection of the drawings hereunto annexed.

The improvements which we now desire to have patented relate to a new construction and arrangement of curved arms, forming part of the tubular drill-tooth or depositing-tube, embracing the drag-bar, for diminishing or increasing the angle of the same with the drag-bar to cause it to open a deeper or shallower furrow, to break the wooden holding-pin and turn on the joint-bolt when the tooth strikes against a stone or a stump or other impediment, and thus save the depositing-tube, and likewise to turn in an opposite direction without breaking the wooden pin while backing the machine when the depositing-tube is in the ground, and also to hook upon the axle-tree for suspending the depositing-tube from the ground to prevent it from being injured while moving the machine from the farm-yard to the place where it is to be used upon its own wheels. Said curved arms serving also the purpose of braces to stay the depositing-tube from any lateral movement during its operation, or when the machine is run backward or turned short and suddenly while the tube is in the ground. Likewise, in the employment of spring bearing-plates for the boxes of the gudgeons of the seed-roller to confine it in its proper place, and yet be allowed to yield when the surface of the roller is uneven or swollen from any cause, and for adjusting the roller to the grate.

Figure 1 represents an elevation of the side of the machine as in operation, the drill-tooth or depositing-tube forming an angle of about eighty-three degrees with the drag-bar or jointed beam. Fig. 2 is a sectional view, showing the hopper and gearing for operating the seeding-cylinders and one of the drill-tubes or depositing-tubes set for deeper planting, being at a lesser angle with the jointed beam or drag-bar than is shown in Fig. 1. Fig. 3 is a view showing the position of the drill-tube when it strikes a rock or stone while the machine is progressing, the wooden holding-pin having been broken by the concussion. Fig. 4 is a view showing the position of the drill-tube when the machine is backing or turning short round. Fig. 5 is a view showing the position of the drill-tube when elevated and suspended to the transverse shaft or axle-tree to preserve the tubes from injury while moving the machine from place to place upon its own wheels. Fig. 6 is a plan of the tubular drill-tooth, curved arms, and drag-bar. Fig. 7 represents a modification of our improvement in which the jointed brace is represented as being attached to an adjustive slide secured at the required position on the drag-bar or jointed beam. Fig. 8 is a vertical longitudinal section of the clamp. Fig. 9 is a bird's-eye view of one of the hoppers, showing the manner of applying the spring to the grate. Fig. 10 is a vertical section of Fig. 9 on the line *x x*. Fig. 11 is an inverted view.

Similar letters in the several figures refer to corresponding parts.

*a a* in the annexed drawings represent the two curved or claw-shaped arms projecting from the depositing-tube, arranged so as to bring the drag-bar between them, and bearing against its sides and imparting lateral stability to the tube when in operation. In each of these arms is made a curved row of holes for the inserting of a wooden pin, designed to cross the drag-bar at right angles and to rest thereupon during the opening of a furrow by the seed-depositing tube as the machine is drawn forward, and to rise therefrom in the arc of a circle when the machine is being backed or turned, to allow the tube to change its position accordingly without producing any strain on the tube or its joint-pin, or on the wooden-pin, as shown in Fig. 4, and besides the forward folding prevents the tube becoming clogged or stopped up at the lower end with earth when the horses move the drill backward or short round with the tube in the ground.

*b* is the wooden safety gage-pin passing through two of the holes in the arms, and resting upon the drag-bar $d$ when the machine is in operation. This pin should be of such strength as to hold the depositing-tube in its required position during the due operation of the machine, and yet that it shall break instead of the tube when the latter accidentally comes in contact with a rock, stump, or other obstruction, causing the tube to turn backward in the arc of a circle and pass over the obstruction without injury, in the manner represented in Fig. 3. When the farmer desires to sow the seed deeper he must withdraw the aforesaid gage-pin from the two holes in which it is inserted, and must insert it into two holes nearer the curved point of the arms, which will have the effect of lessening the angle of the depositing-tube with the drag-bar, and consequently to cause the tube to penetrate the soil to a greater depth; and when he desires to sow the seed shallower he must increase the angle of the furrowing and depositing tube with the drag-bar by inserting the pin into two of the holes nearer the joint-bolt, causing it to approximate to a vertical line. To remove the tube entirely from the ground and bring it nearly parallel with the drag-bar and suspend it in that position the tube must be turned on its journal-bolt and the curved ends of the arms hooked over the axle in the manner represented in Fig. 4. It will thus be seen that these claw-shaped perforated arms and gage-pin serve several valuable purposes.

$c$ is the spring-bearing plates for holding the seed-roller to its proper place in the concavity of the grate, and at the same time allowing it to yield when any hard substance gets between the roller and grate that would stop its operation. In Fig. 1 these plates are made with hooks. In Fig. 11 they are represented with slots and screws at the loose ends. Instead, however, of applying springs to the axle of the planting-cylinder they may be applied to the grate, and thus accomplish the same object, as seen at $e$, Figs. 9 and 10, $e$ being spiral springs and screws, and $f$ being a semi-elliptical spring and screw.

We sometimes accomplish the several offices above named (except that of suspending the depositing-tube to the axle) by having the arm $h$ jointed to the tube $t$ below the drag-bar, and extending it through a mortise, $i$, in an adjustive box or clamp, $k$, affixed to the drag-bar $j$ by means of a tooth, $l$, in the box or clamp entering a notch, $w$, in the drag-bar $j$, and secured by a wedge or key, $m$, the jointed or hinged arm $h$ having a row of holes and a wooden gage and safety-pin $p$, the same as in the forked arm, and to serve the same purpose.

The elevation and suspension of the tubes may be effected by plain as well as hooked arms. The advantage of the hooks, however, is in being able to throw the weight of the tubes upon the axle and strongest part of the machine; or it may be accomplished by passing a supporting bar or rod from end to end of the machine under the points of the tubes after they are passed forward.

We do not claim bracing the tooth laterally by itself, as that is not new; nor do we claim changing the angle of the tooth with the drag-bar, as that has been already done.

Having thus described the nature and character of our invention and improvement on seeding-machines, what we claim as new, and desire to have secured to us by Letters Patent, is—

1. Constructing the tubular drill-tooth with a hook-shaped arm, in the manner and for the purpose herein set forth, by which the drill-tooth is braced laterally while in operation and hooked to the axle when not in operation, and by which the angle of the drill-tooth may be changed at pleasure by changing the position of the wooden pin in said arms, and by which the drill-tooth may be folded toward the drag-bar in backing the machine or turning short round while the drill-tooth is in the ground without breaking the wooden pin, said wooden pin resting upon the top of the drag-bar instead of passing through it, as herein fully set forth.

2. The spiral or any other form of spring, in such combination with the hopper, grate, and seeding-cylinder or the distributing apparatus as will make the said cylinder and grate and hopper self-adjustant each to each, and to the others in case there should be a want of evenness or uniformity upon the surface of the seeding-cylinder or distributing apparatus, for the purpose and in the manner above set forth.

In testimony whereof we have hereunto signed our names before two subscribing witnesses.

SAMUEL PENNOCK.
MORTON PENNOCK.

Witnesses to the signing of Samuel Pennock:
WM. P. ELLIOT,
WM GREER.

Witnesses to the signing of Morton Pennock:
MARY SMITH,
ISAAC SMITH.